United States Patent Office 3,099,590
Patented July 30, 1963

3,099,590
SOLDER FLUXES
Harry B. Laudenslager, Jr., Jamestown, N.Y., assignor to Blackstone Corporation, a corporation of New York
No Drawing. Filed June 25, 1959, Ser. No. 822,754
4 Claims. (Cl. 148—23)

This invention relates to solder fluxes and, particularly, to a solder flux for soft solders and the like. There are a great many soldering applications which require a solder flux having the ability to flow into restricted areas (commonly called "capillarity") and to cause solder to flow into the same restricted areas with good setting and bonding properties. Among such applications are the forming of tubing for automotive radiator cores and the making of cans and the like. A soldering flux to be satisfactory for such applications must be readily washed away after soldering has been completed. It must inhibit oxide formation while in place on the material being soldered. It must be non-toxic, produce a minimum of corrosive products, have good fluxing properties over a wide range of temperatures and have a good spread value. Heretofore, acid chloride fluxes have been generally used in such applications. These usual chloride fluxes require large amounts of cleaning equipment, steam, hot water and time in order to assure complete removal of the fluxes after soldering has been completed. Great difficulty has been experienced in the past by the residue from such fluxes corroding the metal surfaces and attacking and destroying paint coatings applied thereto after the usual cleaning operation. As a result, the chloride fluxes heretofore used have been expensive to handle and remove after the soldering operation was complete and, even after painstaking cleaning operations there was no assurance that the fluxes had been entirely removed.

I have discovered a soldering flux composition which eliminates all of the difficulties characteristic of the chloride fluxes heretofore used. I have discovered a flux composition which is readily soluble in water, has excellent spread characteristics, and is easily removed after completion of the soldering operation. The residue from my flux composition, remaining after the soldering operation, is readily soluble, has very little corrosive action, is non-toxic, easy to handle and non-hygroscopic. In addition, the flux of my invention has very high capillarity and causes the solder to flow into a joint being soldered much more rapidly and smoothly than is the case with the ordinary chloride fluxes of which zinc chloride flux is representative.

I have discovered a soldering flux composed of the reaction product of an organic amine with hydroxyacetic acid, either alone or admixed with a water soluble organic acid having less than 8–10 carbon atoms in the chain, ammonium chloride and a wetting agent, preferably, in an aqueous solution.

Preferably, the flux of my invention contains from about 1% to about 15% of the reaction product of an organic amine and hydroxyacetic acid. When ammonium chloride is present I prefer to have from about 1% to 6% ammonium chloride, about 3% to about 12% of a water soluble organic acid having less than 8–10 carbon atoms and about 0.1% to 0.5% wetting agent. However, I may use up to 16% ammonium chloride, about 1% to 25% of the water soluble organic acid and about 0.1% to 0.8% of a wetting agent with satisfactory results.

Preferably, the reaction product of the organic amine and hydroxyacetic acid is formed by reacting one mol of amine with one mol of hydroxyacetic acid.

The invention will perhaps be better understood by referring to the following examples:

EXAMPLE I

A reaction product of monoethanolamine and hydroxyacetic acid was prepared by slowly adding one mol of hydroxyacetic acid to one mol of monoethanolamine in an ice bath. The material was held at a temperature below 55° C. and was agitated slowly. A reaction product in the form of water soluble crystals was recovered. These crystals had a melting point of about 186°–190° F., a boiling point of about 315–335° F., and a decomposition temperature of about 575°±10° F. On analysis the crystals showed 9.58% nitrogen and 33.05% carbon. About 104 B.t.u. of heat per lb. of reaction product was produced by the reaction.

This reaction product was added to water containing 0.4% "Compound M" wetting agent (Johnson March Co. of Philadelphia brand of polyether alcohols of varying chain lengths) and was tested for spread by the ASTM Spread Test Special Publication 189 with the following results.

| Amt. of reaction of product in sol.: | Spread value |
|---|---|
| 1% | 93.7 |
| 2% | 88.2 |
| 3% | 92.6 |
| 4% | 93.3 |
| 5% | 93.3 |
| 6% | 94.1 |

Similar tests for comparison purposes were made using zinc chloride in water containing 0.4% wetting agent with the following values.

| | Spread, percent |
|---|---|
| 14° Baumé zinc chloride sol. (about 12% sol.) | 91.2 |
| 15° Baumé zinc chloride sol. (about 13% sol.) | 90.6 |

EXAMPLE II

One percent of the reaction product of Example I was mixed in aqueous solution with 3.5% of hydroxyacetic acid and 4% ammonium chloride and spread tests were made. The spread value was 91.5%.

EXAMPLE III

Similarly, two percent of the reaction product of Example I was mixed in aqueous solution with 3.5% hydroxyacetic acid and 4% ammonium chloride. The spread test value was 90.8%.

EXAMPLE IV

The reaction product of Example I was formed into a paste flux by combining with Tergitol XD (an alkyl polyalkylene glycol) and petroleum jelly with excellent results. It was found that in such paste fluxes the amount of reaction product must not exceed 50%.

The reaction products of other organic amines were similarly prepared and spread tests made. These values appear hereinafter in Table I.

Table I

| | Percent spread: 1% of pure reaction product in 3.5% HoHAc 4% NH₄Cl | Percent spread: 2% of pure reaction product in 3.5% HoHAc 4% NH₄Cl |
|---|---|---|
| Diethanolamine | 90.0 | 89.4 |
| Triethanolamine | 91.5 | 91.5 |
| Isopropylamine | 90.8 | 91.5 |
| Diethylene Triamine | 89.5 | 90.1 |
| 1:2 HoHAc | 89.4 | 90.4 |
| 1:3 HoHAc | 90.8 | 90.6 |
| B Alanine | 90.2 | 91.6 |
| N Butylamine | 90.7 | 92.6 |
| Monoisopropanolamine | 92.0 | 89.9 |
| Diethylethanolamine | 90.5 | 91.5 |
| Di-N-Butylamine | 89.8 | 90.4 |
| N-aminopropylmorpholine | 91.0 | 89.8 |
| Triethylene tetramine | 89.8 | 92.0 |
| Tetraethylenepentamine | 87.3 | 90.1 |
| Diisopropanolamine | 91.6 | 90.2 |

The reaction product is preferably used in aqueous solution but may be used in alcohol provided there is at least 1% of water present to dissolve the reaction product. Alcohol is a useful carrier where the flux is to be mixed with an oil or grease.

Preferably, I use not more than 15% of reaction product in any alcoholic flux composition because high amounts do not appear to increase the efficiency but in some cases actually appear to reduce efficiency through esterification.

Various wetting agents such as Tergitol EH, Tergitol #4 (higher sodium alkyl sulfates produced by Carbide and Carbon Chemicals Co.), Compound M, previously mentioned, Duponol 80 and others may be used with the flux of this invention.

While I have illustrated and described certain present preferred embodiments of my invention, it will be understood that this invention may be otherwise embodied within the scope of the following claims.

I claim:

1. A solder flux composition consisting essentially of about 1% to 15% of the reaction product of an organic amine with hydroxyacetic acid, about 1% to 16% ammonium chloride, about 1% to 25% of a water soluble organic acid having less than 10 carbon atoms, about 0.1% to 0.8% of a wetting agent and the balance a carrier vehicle.

2. A solder flux composition as claimed in claim 1 wherein the organic amine is ethanolamine.

3. A solder flux composition as claimed in claim 1 wherein the carrier vehicle is water.

4. A solder flux composition consisting essentially of about 1% of the reaction product of one mol of ethanolamine with one mol of hydroxyacetic acid, about 3.5% hydroxyacetic acid, about 4% ammonium chloride and the balance water.

References Cited in the file of this patent
UNITED STATES PATENTS

| | | |
|---|---|---|
| 2,581,820 | Stright | Jan. 8, 1952 |
| 2,895,862 | Laudenslager | July 21, 1959 |
| 2,904,459 | Kubota | Sept. 15, 1959 |
| 2,928,872 | Shapiro et al. | Mar. 15, 1960 |